July 3, 1923.
E. L. MÜLLER
1,460,431
ARRANGEMENT OF OIL PUMPS
Filed Dec. 22, 1922
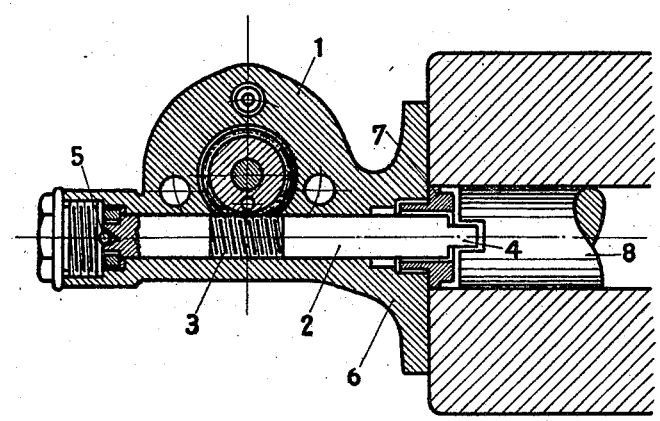
Inventor:

Patented July 3, 1923.

1,460,431

UNITED STATES PATENT OFFICE.

EUGEN LUDWIG MÜLLER, OF MUNICH, GERMANY.

ARRANGEMENT OF OIL PUMPS.

Application filed December 22, 1922. Serial No. 608,538.

*To all whom it may concern:*

Be it known that I, EUGEN LUDWIG MÜLLER, a citizen of Germany, residing at Munich, in the Republic of Germany, have invented certain new and useful Improvements in Arrangements of Oil Pumps, of which the following is a specification, reference being had therein to the accompanying drawing.

This invention relates to an arrangement of an oil pump on a driving or driven machine and more particularly to such pumps as are actuated by the machine shaft on the same axis as the pump shaft.

Hitherto the pumps used on such engines or other machines have been attached in such a manner that they were either fastened on to a bed plate already there or to a special bed plate constructed for the purpose. This method of attaching is costly as the fitting of the bed plate surfaces must be very accurate and it requires a skilled workman to erect the pump in order to assure accurate alignment between the machine shaft and the pump shaft.

The above disadvantages are overcome by the arrangement covered in this present invention. The pump is so formed that it is fixed by a flange at right angles to the engine shaft and is provided with a centering spigot in direct contact with the bearing in which the driving shaft of the engine lies so that the pump shaft and the machine shaft are co-axial. The connection between the pump shaft and the driving shaft may be a simple dog. By this arrangement errors in assembling are practically impossible and the machining cost hitherto necessary is non-existant as the fitting of the surfaces by which the pump shaft is attached to the engine shaft is a simultaneous operation to the fitting of the bearings for the machine shaft.

The arrangement covered by the present invention has the further advantage that it gives a pleasing exterior appearance in so far as the pump forms a complete unit with the machine and the pump shaft is not visible. The drops of oil which may overflow during the operation of the pump pass straight into the bearing in which the machine shaft or engine shaft rotates and cannot therefore make the surroundings of the pump dirty as is hitherto usual in pumps mounted on engine bed plates.

A method of carrying out the invention is shown by way of example in the drawings.

The pump casing 1 is provided with a flange 6 which is placed at right angles to the pump shaft 2 and also with a centering spigot 7 by which it is attached to the bearing of the machine shaft 8. The pump shaft 2 is adapted to engage by means of its dog 4 with a corresponding recess in the machine shaft 8.

I claim:—

The combination of a machine bearing, a machine shaft journalled in the bore of the said bearing, an oil pump casing, a worm shaft journalled in the pump casing, a fixing flange connected with the pump casing and having a surface extending at right angles to the said worm shaft and abutting on the said machine bearing, a pump driving worm wheel engaging with the said worm and enclosed in the pump casing, a centering member associated with an end of the said worm shaft and projecting from the said flange into the bore of the machine bearing, and a connecting member at the end of the worm shaft and projecting into a slot in the machine shaft.

In testimony whereof I affix my signature in presence of two witnesses.

EUGEN LUDWIG MÜLLER.

Witnesses:
ALEXANDER DOLPH,
EMMA SCHMITT.